2 Sheets--Sheet 1.

DWIGHT SLATE.

Improvement in Tool for Grinding Lathe-Centers.

No. 126,160.            Patented April 30, 1872.

Witnesses            Inventor

2 Sheets--Sheet 2.

DWIGHT SLATE.

Improvement in Tool for Grinding Lathe-Centers.

No. 126,160.                      Patented April 30, 1872.

Witnesses                      Inventor

126,160

UNITED STATES PATENT OFFICE.

DWIGHT SLATE, OF HARTFORD, CONNECTICUT.

IMPROVEMENT IN TOOL FOR GRINDING LATHE-CENTERS.

Specification forming part of Letters Patent No. 126,160, dated April 30, 1872.

SPECIFICATION.

*To all whom it may concern:*

Be it known that I, DWIGHT SLATE, of Hartford, in the county of Hartford and State of Connecticut, have invented a new and useful Tool for Grinding Lathe-Centers; and I do hereby declare that the following is a full, clear, and exact description thereof, whereby a person skilled in the art can make and use the same, reference being had to the accompanying drawing and to the letters of reference marked thereon.

Like letters in the figures indicate the same parts.

My invention consists in a rotary grinding-tool, which fits into the ordinary tool-rest of a lathe, and is operated by hand through suitable gearing. The object of my invention is to provide a means of grinding the centers of lathes after they are tempered and placed in position. Heretofore the usual practice has been to turn the centers off in the lathe, and afterward temper them to harden the points. The process of tempering or hardening warps the centers more or less, so that when they are replaced in the lathe they are out of true—that is, the points are not exactly in the axis of revolution of the spindle. This causes an eccentricity in the work done, and if any article turned is taken out of the lathe and replaced, turned round to an angle of one hundred and eighty degrees to its former position, the error is doubled. By means of my invention the points of the centers are ground in position, so that the points are exactly in the axis of the spindle.

Figure 1:
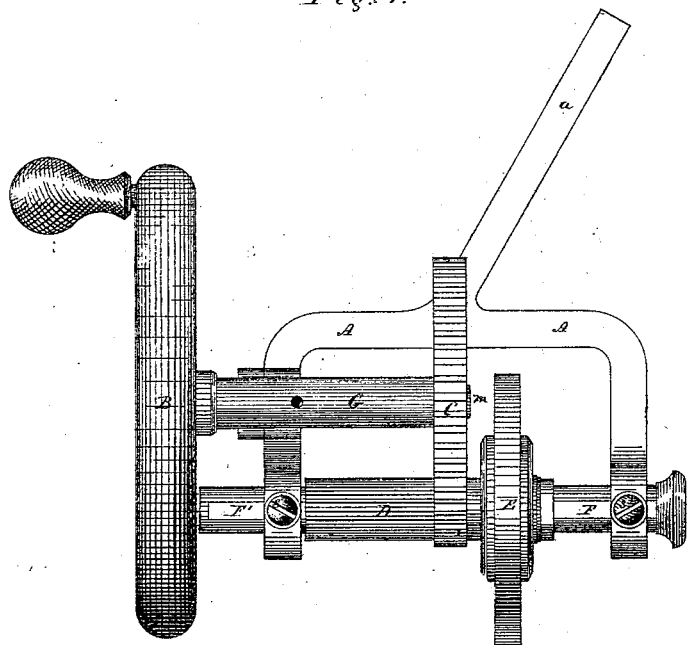
Figure 2:
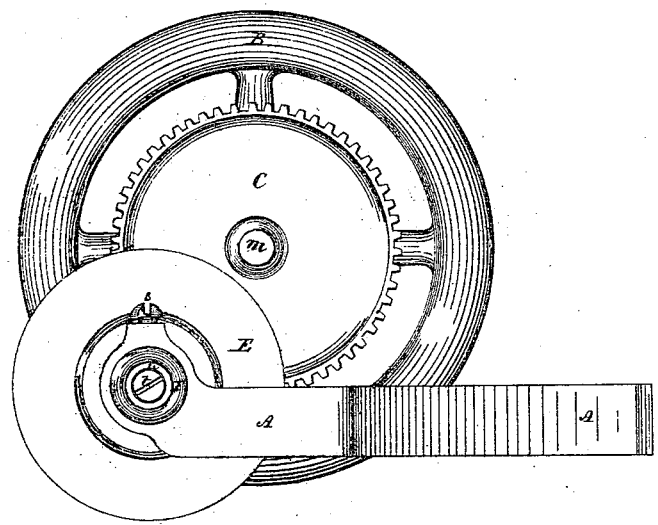

In the accompanying drawing, on two sheets, Figure 1 is a top view of my improved grinding-tool, and Fig. 2 is a right-hand end view of the same.

A is the frame of the tool, to which the working-parts are attached. B is the crank-wheel, to which the power is applied. C is a gear-wheel on the same arbor, working into the pinion D. E is the grinding-wheel, which may be of emery, stone, or any suitable grinding composition. This wheel and the pinion D are fixed on the same arbor. F and F' are sleeves in which the arbor of D and E turn. The journals pass through F and F', and are secured by washers and screws, as shown at $u$ and $t$ in Fig. 2, so that the sleeves and arbor move together laterally through boxes in the frame A. The tops of the sleeves are flattened so that the set-screws $s\ s$ keep them from turning, but permit them to move endwise. The frame A also has the box G, through which the arbor $m$ passes to connect the wheels B and C. The part of the frame $a$ which fits into the tool-rest may be made at an angle, as shown in the drawing, for convenience in use; or it may be square with the arbors of the wheels, and the position of the tool-rest made to give the proper angle to the arbor of the grinding-wheel.

The operation of my invention is as follows: The part $a$ is placed in the tool-rest, and the position of the arbor of the grinding-wheel adjusted so as to be parallel to the side of the cone of the center to be ground, and at the same height as its axis. The lathe is set in motion, which causes the center to revolve. The tool is then advanced in the usual manner by the screw of the tool-rest until the wheel E comes in contact with the center; revolution in a contrary direction to that of the center being given to it by means of the wheel and crank B. The grinding-wheel is then moved back and forth along the cone of the center by sliding the sleeves F and F' in the frame. This guides the center to an exact point in the axis of revolution of the lathe-spindle. The center of the movable head of the lathe can be ground true by inserting it in the fixed head and grinding it, as before described.

Claim.

What I claim as my invention is—

The combination of the crank-wheel B, the gear-wheel C, the pinion D, and the grinding-wheel E on the sliding bearings F F', with a frame A, the whole being constructed and arranged substantially as herein described.

DWIGHT SLATE.

Witnesses:
    THEO. G. ELLIS,
    BEN. A. COOKE.